United States Patent Office 3,382,619
Patented May 14, 1968

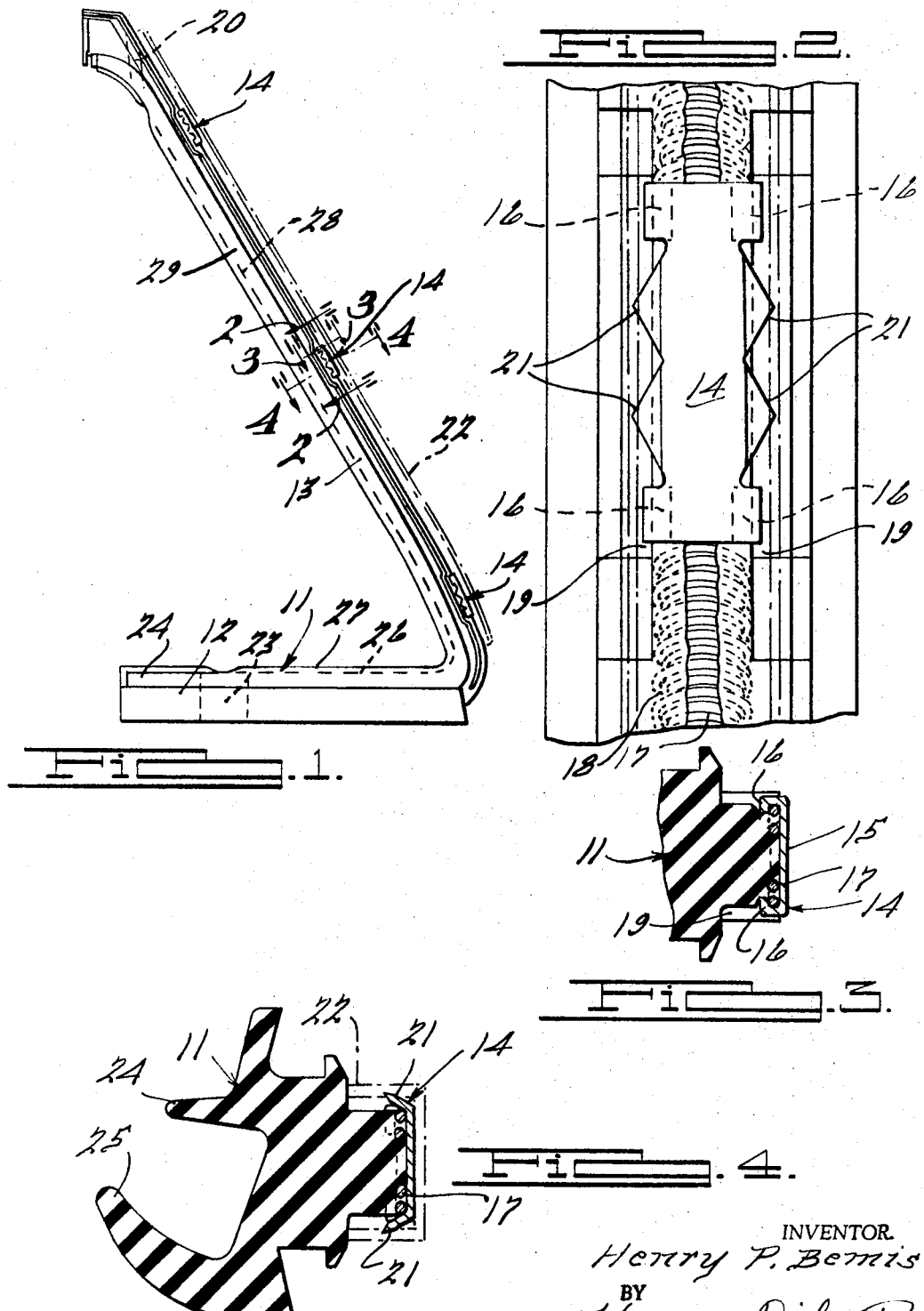

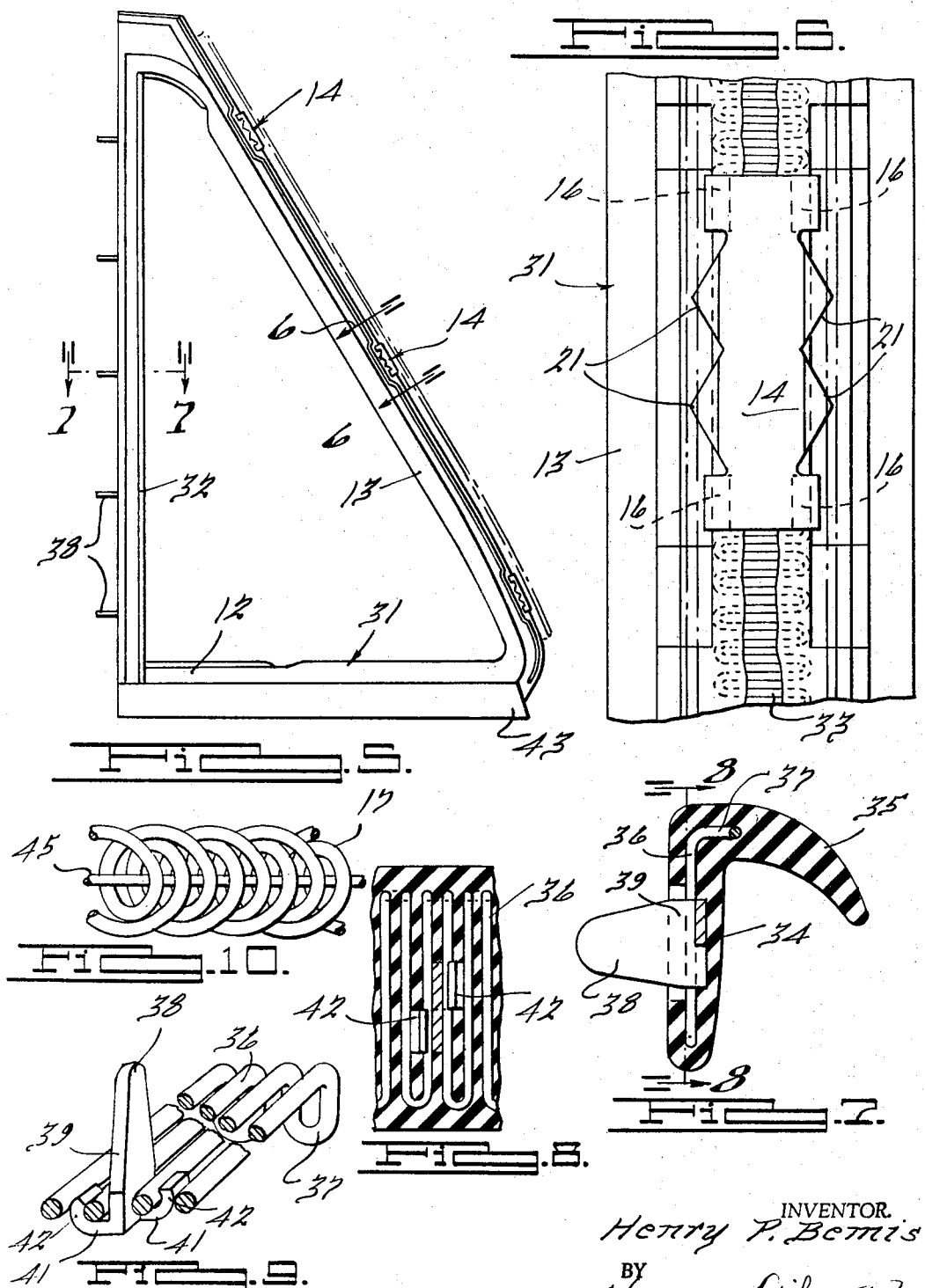

3,382,619
FLEXIBLE SUPPORT AND REINFORCEMENT
FOR MOLDED MATERIAL
Henry P. Bemis, Birmingham, Mich., assignor, by mesne assignments, to Sheller-Globe Corporation, a corporation of Ohio
Filed Oct. 13, 1965, Ser. No. 495,487
6 Claims. (Cl. 49—493)

ABSTRACT OF THE DISCLOSURE

A flexible reinforced sealing strip for use on the triangular shaped vent windows of automobiles wherein the structure of the sealing strip is such that it is enabled to bend forwardly or laterally to assume a greater curvature while providing sufficient support for retaining clips which hold the sealing strip in position. The sealing strip is comprised of an elastomeric material having a sealing lip on the inner face engageable by a panel to be sealed when in closed position, and a flexible metal reinforcing strip embedded within the elastomeric material and made from wire which is flattened and provides lateral rigidity between the side edges for supporting the securing clips.

Summary of the invention

A sealing strip made of elastomeric material having a sealing lip on the inner face engageable by a panel to be sealed when in closed position, and a flexible reinforcing strip made from wire which is fattened to form a flat elongated reinforcing element which is embedded in the outer face of the sealing strip and which provides lateral rigidity between the side edges for supporting securing clips.

This invention relates to sealing strips, and particularly to a sealing strip for a ventilating opening and the flexible reinforcing means therefor.

The ventilators for an automotive vehicle body are of various form, the ones for the front doors are made of glass of substantially triangular or rectangular form and supported in a metal frame disposed at one, two, or all sides thereof. The ventilator panel is pivoted to swing in the opening defined by a forward sloping or vertical channel, a substantially vertical division channel and the bottom of the window opening where a slot is formed between the inner and outer door panels. Rubber sealing strips are mounted in the channels and slot, over portion of which the edge of the ventilator panel slides and against other portions of which it abuts to provide the seal. It has been the practice where die cast channels are used which cannot be clinched to employ an L-shaped elastometric strip having a metal strip or a plurality of wires embedded in the sloping vertical front portion which supported clips by which the portion is secured within the sloping channel at the front edge of the ventilator opening. The rearward portion of the L-shaped strip extends in the horizontal slot between the door panels and in an aperture through which a bottom supporting pivot extends. A pivot is provided within or adjacent to the forward sloping channel at the front opening aligned with the bottom pivot and secured to the ventilator panel for opening and closing movement. The reinforcement for a strip now being used is made from a notched steel strip or steel wires to provide some flexibility thereto so as to follow any slight change in contour of the ventilator opening.

The present invention contemplates the use of a more flexible reinforcing strip which will permit the sealing strip to bend forwardly and laterally to assume a greater curvature while providing sufficient support for the clips which are retained thereby. The flat flexible strip may be made of a single coiled wire or a plurality of nested coils of small diameter which is flattened to produce a narrow thin flexible strip having substantial lateral strength, with the side edges substantially continuous. The same effect is obtained in a strip made from wire which passes back and forth in a plane to produce a sinuous strip with the lateral bars closely spaced to provide support for the securing clips when bent around the edges thereof. The strip, made from a continuous wire, provides flexibility in the plane of the strip and laterally thereof.

It is within the purview of the invention to make a sealing strip which has the third side closed by an elastomeric section which is attached to the division channel in the same or different manner from that of the L-shaped elastomeric portion.

Accordingly, the main objects of the invention are: to embed a flexible reinforcing strip within one face of an elastomeric sealing strip which permits the strip to be bent a substantial amount in its plane and transversely thereof; to provide a flexible reinforcing strip embedded in the wall of elastomeric sealing strip having sufficient lateral strength to support securing clips, rivets or tabs when fingers thereof are bent around the edges of the strip; to form a triangular or rectangular shaped elastomeric sealing strip having flexible reinforcing strips embedded in two or more sides thereof capable of supporting clips by which the sealing strip is secured in an opening, and in general, to provide a flexible reinforcing strip for a sealing strip which is simple in construction, which has a great amount of flexibility in its plane and laterally thereof, and which is economical of manufacture.

Other objects and features of novelty of the invention will be specifically pointed out or will become apparent when referring, for a better understanding of the invention, to the following description taken in conjunction with the accompanying drawings, wherein:

FIGURE 1 is a view in elevation of a sealing strip embodying features of the present invention;

FIG. 2 is an enlarged broken sectional view of the structure illustrated in FIG. 1, taken on the line 2—2 thereof;

FIG. 3 is an enlarged broken sectional view of the structure illustrated in FIG. 1, taken on the line 3—3 thereof;

FIG. 4 is an enlarged sectional view of the structure illustrated in FIG. 1, taken on the line 4—4 thereof;

FIG. 5 is a view of structure similar to that illustrated in FIG. 1, showing a further form of the invention;

FIG. 6 is an enlarged broken sectional view of the structure illustrated in FIG. 5, taken on the line 6—6 thereof;

FIG. 7 is an enlarged sectional view of the structure illustrated in FIG. 5, taken on the line 7—7 thereof;

FIG. 8 is a sectional view of the structure illustrated in FIG. 7, taken on the line 8—8 thereof;

FIG. 9 is an enlarged broken view of the reinforcing strip illustrated in FIG. 8 with a securing clip attached thereto; and FIG. 10 is a plan view of a reinforcing strip showing a further form thereof.

Referring to FIGURES 1 to 4 inclusive, a sealing strip 11 of conventional form is made of elastomeric material having a horizontal portion 12 and a sloping vertical portion 13 disposed in angular relation to each other. The portion 12 fits within the slot provided between the outer and inner door panels, while the portion 13 is secured within a metal channel element 22 by a plurality of clips 14 which are secured to the sealing strip portion 13. The clip 14 has a web 15 with fingers 16 at each end which are bent around a flexible supporting strip 17. The strip is embedded in the elastomeric material of the portion 13 to be adjacent to the face 18 at the rear of the strip. Recesses 19 are provided inwardly of the face to have the edges of the reinforcing strip made available thereat so that the fingers 16 of the clips 14 can be bent therearound. The web of the clips has sloping pointed fingers 21 which extend within the metal of the side wall of a supporting channel 22 as illustrated in FIG. 4 to securely anchor the sealing strip portion 13 therewithin. The sealing strip 11 has an aperture 23 in the portion 12 and an aperture 20 in the upper end of the portion 13 for the pivots which support the ventilator panel for pivotal movement from and against the sealing strip. When the ventilator panel is moved to closed position the section thereof to the left of the aperture 23 as illustrated in FIG. 1 moves over a lip 24 and abuts against the sealing lip 25. That portion of the ventilator panel to the right of the aperture 23 rides over a lip 26 and abuts against a sealing lip 27. Similarly, in the section 13 the ventilator panel rides over a lip 28 and abuts against a sealing lip 29.

The sealing strip portion 13 may assume an arcuate form in a vertical plane as well as an arcuate form laterally of the plane to permit the strip to follow the arcuate form of the opening and of the ventilator panel which is to be sealed therein. In order that the sealing strip be reinforced to support the clips 14 and at the same time to provide greater flexibility in the plane of the strip and transversely thereof, the flexible strip 17 made from a continuous wire is embedded in the face 18 of the portion 13. Three clips 14 are herein illustrated as being secured in the three recessed areas 19 which are of the same width as that of the reinforcing strip so that the fingers 16 of the clip will be adjacent to the edges thereof when bent therearound to securely anchor the clips to the portion 13 of the securing strip.

The flexible reinforcing strip illustrated in FIGS. 1 to 4 is made from a pair of wire coils interengaging each other and flattened to produce the length of reinforcing strip having substantially continuous side edges. The strip readily anchors into the elastomeric material which passes through the flattened coils and provides lateral rigidity to support the clips when the fingers 16 are bent thereabout as clearly illustrated in FIG. 3.

In FIGS. 5 to 9 a weatherstrip 31 is illustrated having a horizontal portion 12 and an angular portion 13 joined by a portion 32 which is to be supported in the division channel of the window opening. In FIG. 6 it will be noted that the portion 13 has a flexible strip 33 embedded therein which is made of wire bent back and forth into sinuous form to provide flexibility in the plane of the strip and laterally thereof. The sinuous strip provides aligned edges over which the fingers 16 of the clip 14 are securely anchored when bent therebeneath. The sealing strip portion 32, as illustrated in FIGS. 7, 8 and 9 has a base portion 34 and a sealing lip 35 against which the ventilator panel abuts when in closed position. The base portion 34 and the adjacent end of the lip 35 is reinforced by a flexible strip 36 which is made of wire bent back and forth in sinuous form to provide flexibility in the planes thereof and laterally thereto. The strip 36 is bent at right angles to provide an upstanding section 37 which extends within the lip 35 to reinforce the bottom portion thereof. The division channel at the ventilator opening has spaced slots therein for receiving fingers 38 of tabs 39 supported on the strip 36. The bottom end of the tab, as illustrated in FIG. 9, has outwardly deflected flange portions 41 which are arcuately bent backwardly toward the finger 38 with the ends spaced therefrom a distance less than the diameter of the wire of the strip 36. The finger 38 extends between adjacent pair of wires which are snapped into the flanged portions as illustrated in FIG. 9 and retain the tab firmly fixed to the reinforcing strip. The securing strip portion 32 will be secured in the division strip when the fingers 38 of the tabs have been inserted through the apertures thereof and bent against the inner wall of the division strip. The portion 13 of the sealing strip 31 has the clips 14 secured into the bottom of the channel strip 22 and the portion 12 thereof will fit within the space between the inner and outer door panels with inner and outer skirt portions 43 resting thereon. Even if the channel 22 and the division channel are arcuately formed in either or both directions along the webs thereof, the sealing strip will conform to the shape thereof and of the ventilator panel which is to be sealed thereby.

By using the flexible strips 17, 33 and 36, the portions 13 and 32 of the sealing strips 11 and 31 may assume the arcuate shape in any plane in which the supporting channels are shaped. While different types of flexible reinforcing strips have been heretofore employed, the strip employed in the present sealing strip provides lateral rigidity for securing the clips to the sealing strip while maintaining flexibility in all directions. By forming the reinforcing strip from a continuous wire, the spaces thereabout permit the elastomeric material to flow thereinto and thereby securely anchor the reinforcing strip to the sealing strip.

In FIG. 10, a further form of flexible reinforcing strip is illustrated, that wherein the double coiled portion 17 has a cable or wire 45 embedded therein to limit or prevent the portion 17 from stretching longitudinally of its length. The cable or wire 45 is fed through the center of the winding head as the single or nested coils are being wound. When flattened, the cable or wire will be embedded in the coils and the elongation of the flattened strip is limited or prevented thereby while the flexibility of the strip is retained.

What is claimed is:

1. In a sealing strip made of elastomeric material having an inwardly extending sealing lip, a flexible reinforcing element embedded in said strip, said reinforcing element comprising coiled wire means with the coils flattened upon themselves to provide a strip rectangular in section having substantial rigidity between the side edges for supporting securing clips, and securing clips having fingers bent around the side edges of the reinforcing element in fixed relation thereto.

2. In a sealing strip made of elastomeric material having a horizontal portion and a vertical portion extending in angular relation to each other, lip means on the inner edges of the sealing strip portions against which a panel is sealed when in closed position, and a reinforcing strip made from turns of wires which are flattened to form a thin strip with substantially continuous side edges, the reinforcing strip being embedded in the outer face of the vertical portion of the sealing strip to provide flexibility in all directions and lateral rigidity between the side edges.

3. In a sealing strip made of elastomeric material having a horizontal portion and a vertical portion disposed in angular relation to each other, sealing lips extending from the inner face of the two portions for sealing a panel when in closed position, and a formed wire reinforcing strip made from turns of wires which are flattened to form a thin strip with substantially continuous side edges embedded in the outer face of the vertical portion of the sealing strip to provide flexibility thereto in all directions and rigidity between the side edges, the width of the elastomeric material being greater than the width of the reinforcing strip at the outer face except for recesses therein which provide spaced areas substantially the width of the sealing strip.

4. In a sealing strip having a body and a sealing lip on one side, a reinforcing strip made of wire bent back and forth in sinuous form and further bent along one side edge at substantial right angle to the main portion of the strip, the main portion of said strip being embedded in the material of the body with the right angle bent portion extending within the base of the sealing lip, and tabs extending between adjacent wires of the reinforcing strip having reversely bent oppositely extending flanges secured to the adjacent wires in fixed relation to the reinforcing strip.

5. In a sealing element made of elastomeric material having a horizontal portion, a vertical portion and an angular portion joined thereto, a reinforcing strip made from turns of wire which are flattened to form a thin strip with substantially continuous side edges embedded in the outer face of the angular portion to provide flexibility thereto in all directions and rigidity between the side edges, and clips having fingers bent around the side edges of the reinforcing strip by which the strip is secured to a member.

6. In a sealing element made of elastomeric material having a horizontal portion, a vertical portion and an angular portion joined thereto, a reinforcing strip made of wire embedded in the outer face of the angular portion to provide flexibility thereto in all directions and rigidity between the side edges, clips having fingers bent around the side edges of the reinforcing strip by which the strip is secured to a member, a second reinforcing strip made of wire bent back and forth in sinuous form and further bent along one edge to provide a right angle section, the second reinforcing strip being embedded within said vertical portion with the right angle section extending along one edge within the material, and tabs extending outwardly from between adjacent wires of the second reinforcing strip by which the second strip is secured to a member.

References Cited

UNITED STATES PATENTS

| | | | |
|---|---|---|---|
| 1,657,520 | 1/1928 | Vaillancourt | 49—489 X |
| 2,026,973 | 1/1936 | Greene | 49—440 X |
| 2,267,433 | 12/1941 | Tea | 49—492 |
| 2,606,059 | 8/1952 | Wernig | 49—391 X |
| 2,676,055 | 4/1954 | Humpal | 49—489 X |
| 2,720,685 | 10/1955 | Harris | 49—493 X |
| 2,761,184 | 9/1956 | Renno | 49—391 |
| 2,817,558 | 12/1957 | Kubacka et al. | 49—495 |
| 2,912,727 | 11/1959 | Sehn | 49—495 X |
| 2,938,245 | 5/1960 | Sehn | 49—495 X |
| 2,938,249 | 5/1960 | Milne | 49—492 |
| 3,071,826 | 1/1963 | Ziffer | 49—492 |
| 3,112,536 | 12/1963 | Gagnier | 49—492 |
| 3,139,303 | 6/1964 | Schutte | 49—391 X |
| 3,167,824 | 2/1965 | Berwanger | 49—495 X |
| 3,172,800 | 3/1965 | Truesdell | 52—717 |
| 3,208,119 | 9/1965 | Seckerson | 52—718 |
| 3,235,919 | 2/1966 | Tomashot | 49—492 |

DAVID J. WILLIAMOWSKY, *Primary Examiner.*

P. C. KANNAN, *Assistant Examiner.*